June 20, 1961    R. H. LAPP ET AL    2,989,124
PRESSURE OPERATED WATER VALVE
Filed Jan. 14, 1960    4 Sheets-Sheet 1

INVENTORS
Roger H. Lapp, Morton Goldman,
Milton E. Goss, Richard W. Froelich
BY
Q. Baxter Warner
Claude Funkhouser
Attorneys

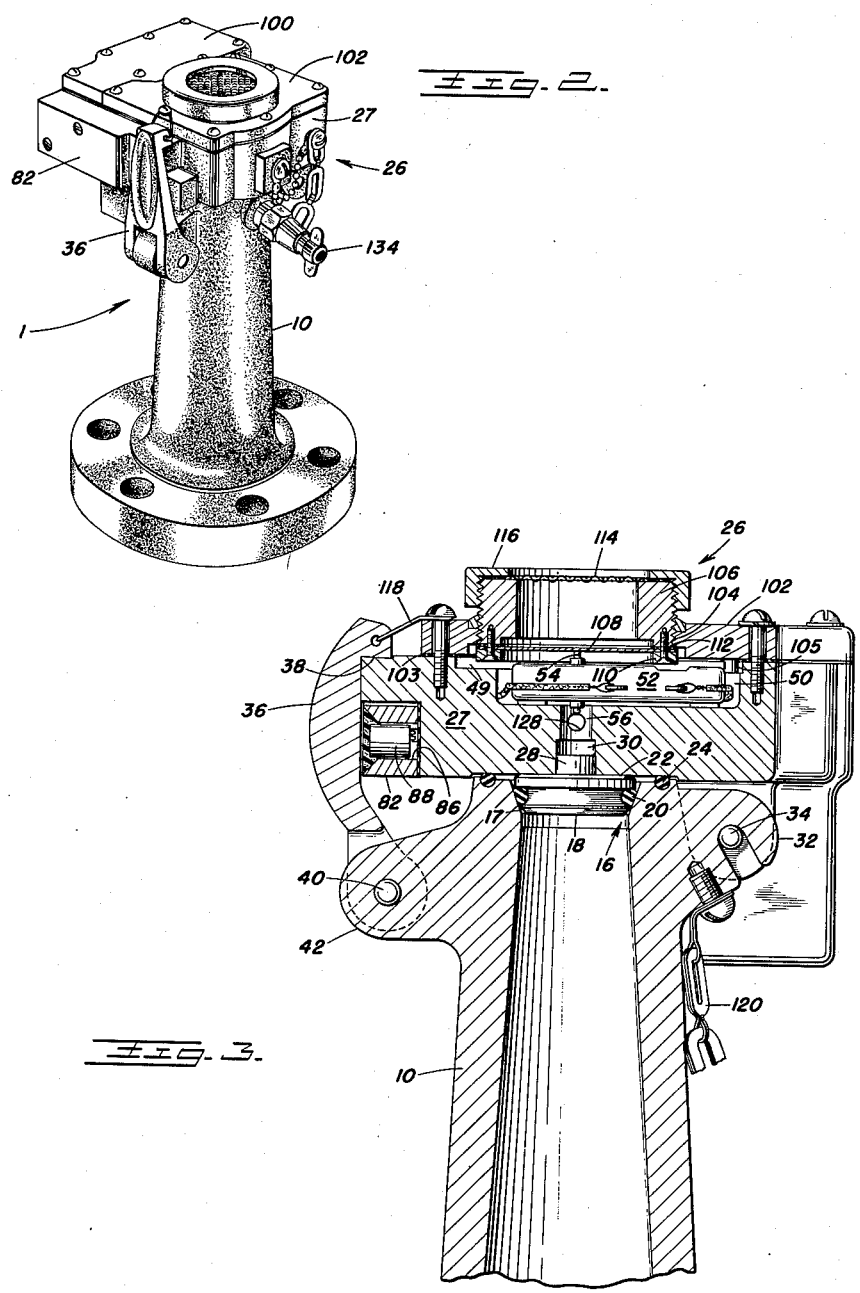

June 20, 1961 R. H. LAPP ET AL 2,989,124
PRESSURE OPERATED WATER VALVE
Filed Jan. 14, 1960 4 Sheets-Sheet 3

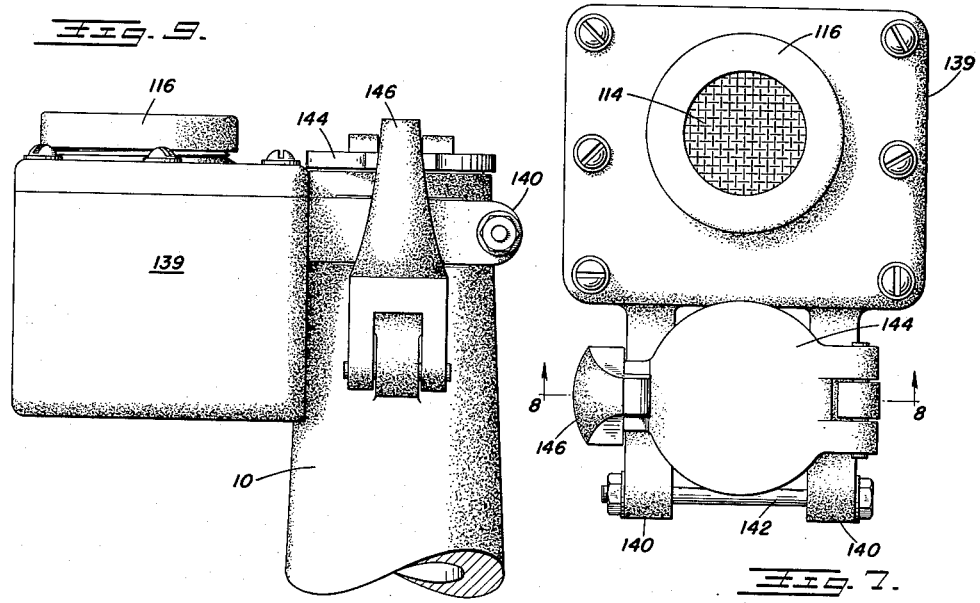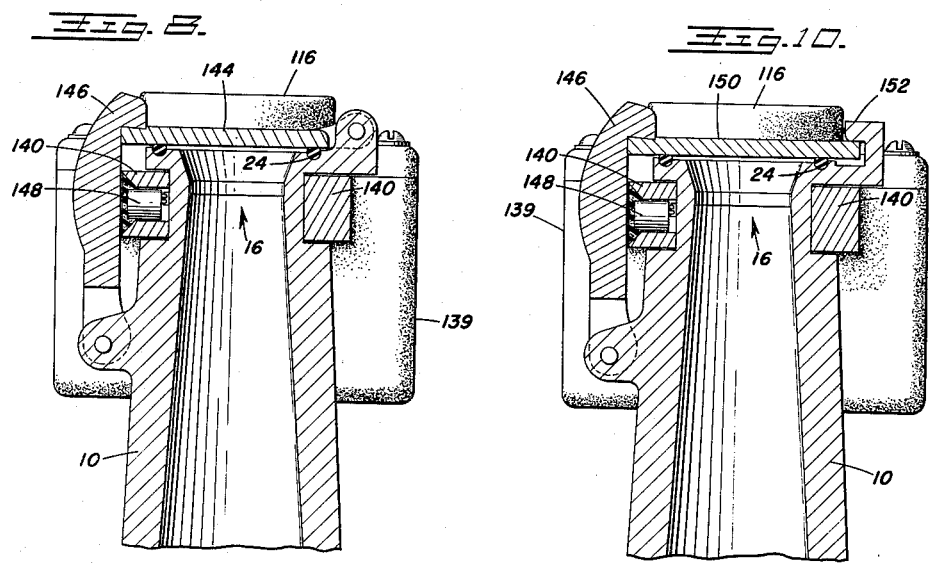

United States Patent Office 2,989,124
Patented June 20, 1961

2,989,124
PRESSURE OPERATED WATER VALVE
Roger H. Lapp, Silver Spring, Md., Morton Goldman, Los Angeles, Calif., Milton E. Goss, Silver Spring, Md., and Richard W. Froelich, Sacramento, Calif., assignors to the United States of America as represented by the Secretary of the Navy
Filed Jan. 14, 1960, Ser. No. 2,555
7 Claims. (Cl. 169—19)

The present invention relates to fire detectors and automatic fire extinguishers; more particularly, this invention relates to a unitary pressure sensitive fire detector and water release mechanism.

The apparatus of the present invention will find utility generally wherever fire protection is desired for an area that is susceptible to blast and fire hazards, as for example, in a structure or compartment containing ammunition, propellants or explosives. One particular application will be discussed herein and relates to the problem of rocket safety in a magazine loaded with booster rockets. In order to offer protection against accidental or inadvertent ignition of one of the stored rockets, means must be provided to extinguish the rocket as soon as possible after ignition.

It is therefore the object of the present invention to provide a unitary device which will detect the ignition of an article, such as a booster rocket stored in a magazine, and operate automatically to extinguish it. Other objects and many of the attendant advantages of this invention will be readily appreciated as the same becomes better understood by reference to the following detailed description when considered in connection with the accompanying drawings.

Briefly, the present invention contemplates a nozzle connected to a water main and having a hinged cover latched over the nozzle orifice to prevent the discharge of water therefrom. Mounted either on the cover or the nozzle is a diaphragm which is responsive to certain pressure waves as would be generated by the incipient ignition of a booster rocket. Movement of the diaphragm exceeding a predetermined amount actuates a switch which closes a circuit between a source of electrical energy and an explosive primer that is in close proximity with a latch. Detonation of the primer then releases the latched cover thereby permitting water under pressure to blow the cover off the nozzle orifice and be discharged therethrough.

In the drawings:

FIG. 2 is a perspective of the detector and water release mechanism constituting the present invention;

FIG. 3 is a cross section of the present invention;

FIG. 7 is a plan view of another embodiment of the present invention;

FIG. 8 is a section taken on line 8—8 of FIG. 7;

FIG. 9 is an end elevation of the embodiment shown in FIG. 7; and

FIG. 10 is still another embodiment of the present invention showing a different mode of securing the cover on the nozzle.

Figure 1:
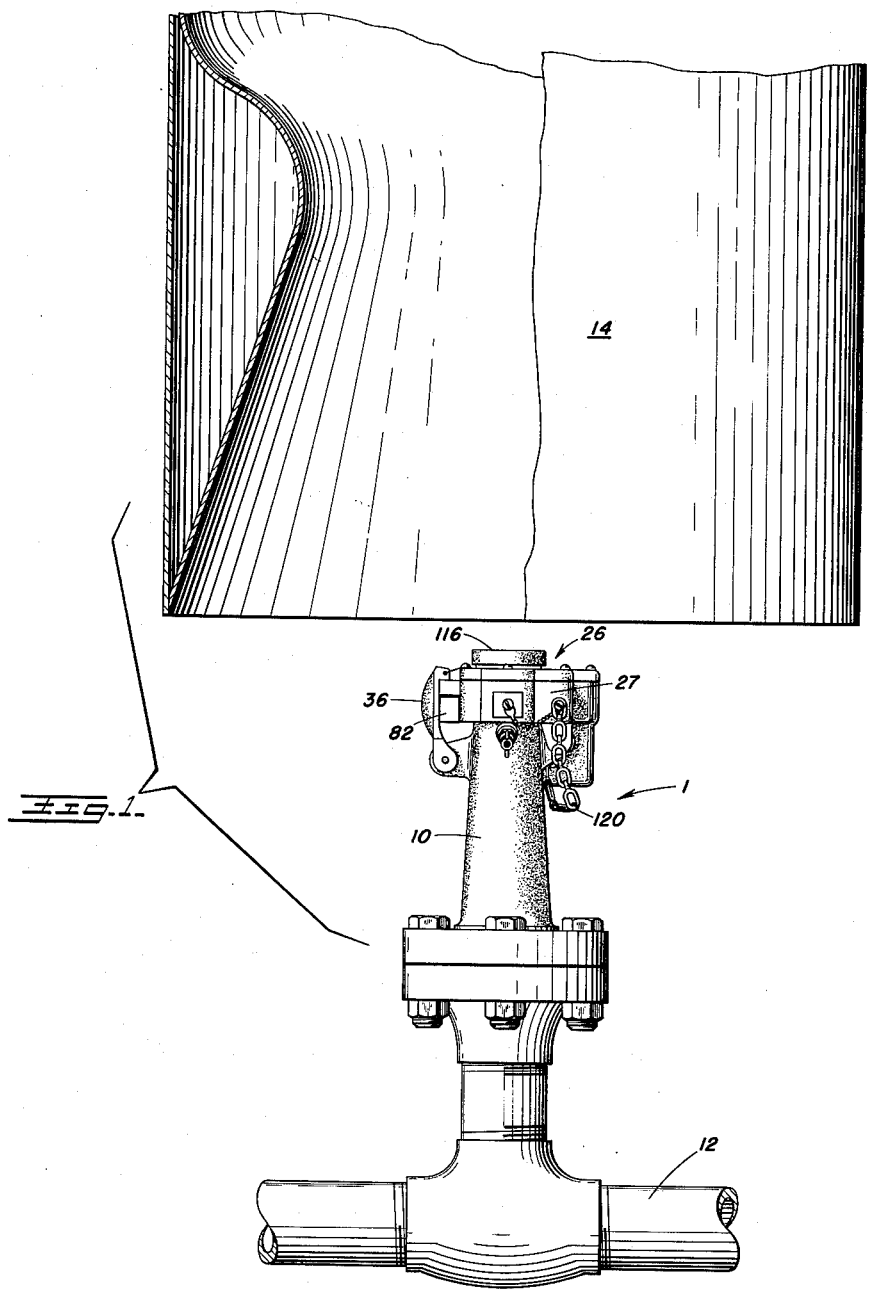
FIG. 1 is an elevation showing the detector and water release mechanism of the present invention located immediately to the rear of a booster rocket.

Referring now to FIG. 1 in detail, a fire detector and water release mechanism 1 including a nozzle body 10 is shown coupled to a water main 12 of a fire fighting system and positioned immediately to the rear of a booster rocket 14 stored in a magazine.

As best seen in FIG. 3, the nozzle body 10 is provided with a discharge opening 16 having flared walls 17. Sealing off the opening 16 is a plug 18 having a grooved periphery for accommodating an O-ring 20 that contacts the flared walls 17. A shoulder 22 is provided on the plug 18 and is so located that when the plug and O-ring 20 are bearing lightly against the flared walls 17, the plane of the shoulder is slightly above the face of the discharge opening 16. A second O-ring 24 is seated in an appropriate groove in the face of the discharge opening 16 and its upper surface is substantially in the plane of the shoulder 22 of the plug 18.

For the purpose of carrying the plug 18 and for urging it into a sealing position, a cover assembly 26 including a cover 27 is provided and engages the plug at the shoulder 22. Engagement between the plug 18 and the cover 27 is also effected by insertion of a projection 28 on the plug in an aperture 30 in the cover. The plug 18 is then in effect made an integral part of the cover by a soldered connection therewith. A slotted lug 32 on the body 10 receives a pin 34 on the cover assembly 26 to provide a pivotal attachment for the cover. In order to constrain the cover assembly 26 in a position which will cause deformation of the O-rings 20 and 24, and resultant sealing thereby, a latch 36 is hinged to the body 10 and engages a lip 38 on the cover in clamped relationship. To ensure positive clamping, the lip 38 is beveled inwardly a slight amount, the latch 36 being attached to a pin 40 that is journalled in an apertured lug 42 on the nozzle body 10.

Figure 4:
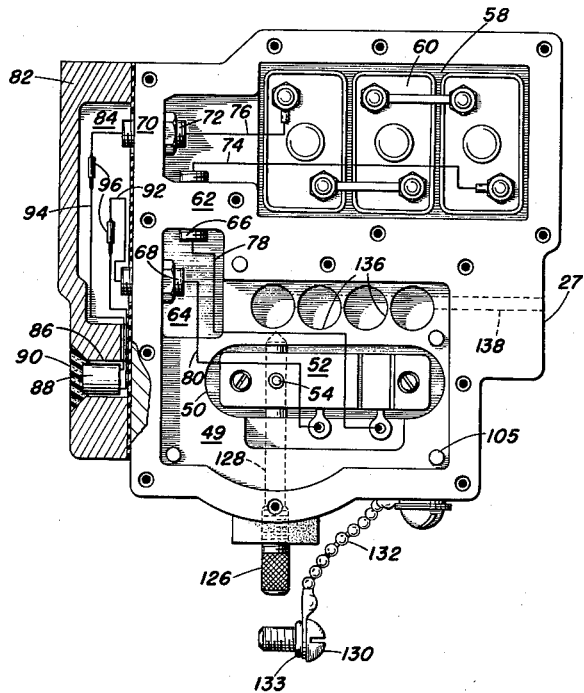
FIG. 4 is a plan view of the present invention with the top plate and head removed and showing the primer housing in section.

Referring now to FIGS. 3 and 4, the cover 27 is shown provided with a compartment 49 that has a recess 50 formed therein to accommodate a switch 52. The switch 52 which is bolted or otherwise suitably secured to the cover 27 is actuable by very slight movement of a plunger 54 that projects from the recess 50 and also extends below the switch body into an aperture 56 in the cover 27.

Provided also in the cover 27 is a battery compartment 58 in which three series-connected long-life nickel-cadmium batteries 60 are located. Separated from the compartment 58 by a wall 62 is a recess 64 which accommodates electrical connecting posts 66 and 68 that extend through and project from the wall 62 and an outside wall 70, respectively. Another connecting post 72 is provided in the battery compartment 58 and, like the post 68, extends through the wall 70. Connecting the switch 52 to the posts 66 and 68 are leads 78 and 80, respectively, while leads 74 and 76 in the compartment 58 couple the batteries 60 to the posts 66 and 72, respectively.

Bolted to the side of the cover 27 is a primer housing 82 having a compartment 84 and an aperture 86 therein. As best seen in FIGS. 2 and 4, the compartment 84 accommodates the projecting portions of the post 68 and 72, while the aperture 86 houses an explosive primer 88. The aperture 86 is positioned such that the primer 88 is immediately under the lip 38 of the cover 27 and in alignment with the latch 36. To secure the primer 88 in the aperture 86 and to furnish a degree of protection therefor, a shallow plug 90 formed of rubber cement is provided over the primer as shown schematically in FIG. 4, the primer 88 is electrically coupled to the batteries 60 and switch 52 by leads 92 and 94 which connect to the post 68 and 72, respectively, through connectors 96.

Referring again to FIG. 2, the cover assembly 26 is shown provided with a plate 100 which closes the battery compartment 58 and which is fastened to the cover 27 by machine screws. In FIG. 3 can be seen a head 102 which closes the compartment 49 and which is also secured to the cover 27 by appropriate machine screws, an elastic gasket 103 being interposed between the head and the cover. In order to insure accurate spacing of the cover 27 from the head 102, a plurality of stop pins 105 are seated in appropriate apertures in the compartment 49. Provided in the head 102 is a threaded aperture 104 extending therethrough which receives an externally threaded ring 106. At the bottom of the ring 106 and closing the end thereof is a diaphragm 108 that is clamped in position by a retainer 110 which is secured to the ring by machine screws. A gasket 112 is provided between the diaphragm 108 and the ring 106. Covering the top of the ring 106 is a screen 114 which is held in place by a cap 116 that threadably engages the ring.

As shown best in FIG. 3, the ring 106 is so located that the diaphragm 108 is centered over the switch plunger 54. By screwing the ring 106 in or out, with respect to the head 102, the diaphragm 108 may also be positioned in contact with the plunger or in spaced relationship therewith depending on the sensitivity desired, a discussion of which will hereinafter be made.

In describing the operation of the present invention, reference is again made to FIG. 1 which shows the detector and water release mechanism 1 coupled to the firemain 12 and positioned at the rear of the stored booster rocket 14. The firemain 12 is part of a fire fighting system and normally carries water at 60–70 p.s.i. In order to prevent the flow of this water from the discharge opening 16, the cover assembly 26 including the plug 18 is clamped in a nozzle-sealing position by engagement of the latch 36 and the lip 38. To insure against accidental disengagement of the latch 36, a lock wire 118 is passed through an aperture in the latch and through the head of one of the machine screws which secures the head 102 to the cover 27.

If inadvertent ignition of the booster rocket 14 occurs, the resultant blast or shock waves will impinge on the diaphragm 108, and when the deflection of the diaphragm is of sufficient magnitude, the switch plunger 54 will be urged into a switch closing position. Closure of the switch 52 then completes the circuit between the batteries 60 and the primer 88 thereby causing the latch 36 to be forcefully disengaged from the lip 38 by resultant detonation of the primer, it being acknowledged that the force of the detonation will also be great enough to cause rupture of the lock wire 118.

Figure 6:
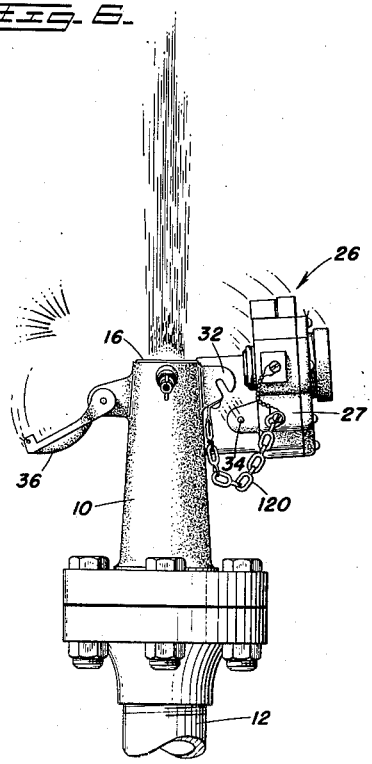
FIG. 6 is an elevation of the detector and water release mechanism after the latch has been released and the cover blown off by the pressurized water.

Since disengagement of the latch 36 frees the cover assembly 26 from the nozzle body 10, the force of the pressurized water in the nozzle flips the cover assembly pivotally about the pin 34. As can be seen in FIG. 6, after the cover assembly 26 has pivoted approximately 90 degrees, the slotted lug 32 allows the cover assembly to fall clear of the discharge opening 16 to permit unrestricted flow of water from the nozzle for extinguishing the burning booster rocket. A chain 120 having its ends secured by machine screws to the nozzle body 10 and the cover 27, respectively, prevent the cover assembly 26 from falling any great distance so as not to incur loss or damage thereof.

It is seen that the detector portion, i.e., the diaphragm 108, the ring 106, the cap 116, the screen 114 and the switch and plunger 52 and 54, respectively, can be adjusted to attain various degrees of sensitivity to blast or shock waves. As shown in FIG. 3, the sensitivity may be made extremely high by positioning the diaphragm 108 in contact or very nearly so with the plunger 54. If less sensitivity is desired, the threaded ring 106 carrying the diaphragm 108 may be turned and backed away from the plunger 54. In the arrangement shown in FIG. 3, the diaphragm 108 is preferably made of non-corrosive metal and the gap between the diaphragm and the plunger should be of the order of .005 inch. The switch 52 selected should actuate by a 5 ounce force on the plunger.

Figure 5:
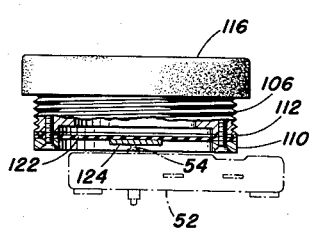
FIG. 5 is an elevation, partly in section, of the detector portion of the present invention.

FIG. 5 shows an alternate detector arrangement in which a neoprene diaphragm 122 carrying a contact plate 124 is substituted for the metallic diaphragm 108. In this arrangement, for proper sensitivity, the plate 124 and the plunger 54 should be in light contact.

Provision is made for placing the detector and water release mechanism 1 in a safe or unarmed condition and comprises means for preventing movement of the plunger 54. In FIG. 4 can be seen a safing pin 126 which is inserted in an aperture 128 in the cover 27. The aperture 128, part of which can be seen in FIG. 3, is located such that insertion of the safing pin 126 will prevent the plunger 54 from being urged downwardly to cause actuation of the switch 52. The safing pin 126 is also used to reset the switch 52 after it has been actuated by the downward movement of the plunger 54. The end of the pin 126 is tapered and engageable with the bottom of the plunger 54 to raise it and thereby change the switch from the closed condition to the open condition. When it is desired that the detector and water release mechanism 1 be armed, the safing pin 126 is extracted and a short screw 130 is substituted in order to close the aperture 128. To prevent loss of the screw 130, it is secured to a short length of chain 132, the other end of which is fastened to the cover 27 by a machine screw. An O-ring 133 is positioned around the threads of the screw 130 to provide a seal when the screw is engaged in the aperture 128.

As can be seen in FIGS. 1, 2 and 6, a valve 134 is located on the nozzle body 10 immediately below the discharge opening 16 to provide means for bleeding air from the system.

In order to render the diaphragms 108 or 122 insensitive to ambient pressure and temperature changes, the compartment 49 below the diaphragm is vented by four apertures 136 which connect to a passageway 138 that opens to the outside of the cover 27.

Another embodiment of the present invention is shown in FIG. 7. In order that the water pressure be allowed to flip the cover as quickly as possible, the detector portion including the diaphragm 108, the ring 106, the cap 116, the screen 114, and the switch and plunger 52 and 54, respectively, along with the battery compartment 58 are carried in a box 139 that is mounted independently on the nozzle body 10 by means of a pair of arms 140 which clamp around the nozzle body. A bolt 142 engages the ends of each of the arms 140 to provide secure fastening thereof to the nozzle body 10. With this arrangement, it is readily seen that the burden imposed on the water stream is considerably lessened since a lightweight cover 144 can now be used to seal off the nozzle opening 16. As best seen in FIG. 8, the cover 144 is hinged at one edge to the nozzle body 10 and clamped at the opposite edge by a latch 146 similar to the latch 36 of the embodiment of FIG. 3. In FIGS. 8 and 9 can be seen a primer 148 that is positioned under the latch 147 and carried in one of the arms 140, appropriate electrical leads being provided for connecting the primer with the components in the box 139.

Still another embodiment is depicted in FIG. 10 which shows an arrangement wherein a "fly-away" cover 150 is clamped in place by engagement of one of its edges with a projection 152 on the nozzle body 10, the opposite edge being held by a latch 146. In this embodiment where the detector components and primer are arranged similarly to the embodiment in FIG. 7, the stream of water pushes against the cover 150 which, when the latch 154 is released by detonation of a primer, flies off to permit a stream of water to quench very quickly the source of the blast that has triggered the device.

Obviously many modifications and variations of the present invention are possible in the light of the above teachings. It is therefore to be understood that within the scope of the appended claims, the invention may be practiced otherwise than as specifically described.

What is claimed is:

1. In combination with a fire fighting system having a firemain and water under pressure in said firemain, a unitary fire detector and water release mechanism for detecting and extinguishing ignition of a propellant or explosive, comprising, a nozzle coupled to said firemain and having a discharge opening, a cover engageable with said discharge opening in sealed relationship, releasable retaining means on said nozzle for constraining said cover in said sealed relationship with said discharge opening, a detector in close proximity with said cover and including a diaphragm responsive to pressure waves produced by ignition of said propellant or explosive, actuating means coupled to said diaphragm and including a source of electrical energy, a switch operable upon movement of said diaphragm in a predetermined amount, and an explosive squib in juxtaposition with said retaining means, whereby pressure waves generated by ignition of said propellant or explosive move said diaphragm to operate said actuating means thereby causing release of said restraining means and thus allowing said water under pressure to disengage said cover from said discharge opening to permit flow of water therefrom.

2. The combination as recited in claim 1 wherein said releasable retaining means includes a hinge connection between one edge of said cover and said nozzle, and a latch pivotally secured to said nozzle and engageable with the opposite edge of said cover.

3. The combination as recited in claim 1 wherein said releasable retaining means includes a projection on said nozzle, said projection being engageable with one edge of said cover to clamp said one edge in sealed relationship with said discharge opening, and a latch pivotally secured to said nozzle and engageable with the opposite edge of said cover.

4. The combination as recited in claim 1 with additionally safing means on said cover and including a pin for restraining movement of said plunger.

5. In a fire fighting system having a firemain and water under pressure in said firemain, the combination therewith of a unitary fire detector and water release mechanism for detecting and controlling the ignition of a propellant or explosive, comprising, a nozzle body coupled to said firemain and having a nozzle opening, a cover pivotally connected to said body and engageable with said opening in sealed relationship, latching means including a member pivotally secured to said body and engageable with said cover for restraining said cover in said sealed relationship with said opening, detecting means on said cover and including a diaphragm, said diaphragm being responsive to pressure waves produced by ignition of said explosive, and actuating means on said cover and including a switch having a plunger coupled to said diaphragm, said switch being operable by movement of said plunger, said actuating means also including a source of electrical energy, a primer in juxtaposition with said member, and circuitry for electrically connecting said switch, source of electrical energy, and primer, whereby said detecting means responds to pressure waves produced by ignition of said propellant or explosive thereby causing said actuating means to release said latching means, thus allowing said water under pressure to pivot said cover from engagement with said opening and permit passage of water therefrom to control said ignition.

6. The combination as recited in claim 5 with additionally safing means including a pin engageable with said plunger for placing said actuating means in an unarmed and safe condition.

7. The combination as recited in claim 5 with additionally venting means on said nozzle body.

References Cited in the file of this patent

UNITED STATES PATENTS

| | | |
|---|---|---|
| 1,869,204 | Lowe et al. | July 26, 1932 |
| 1,938,845 | Lowe | Dec. 12, 1933 |
| 2,333,130 | Thomsen | Nov. 2, 1943 |
| 2,355,185 | Thomsen | Aug. 8, 1944 |
| 2,398,461 | Rider | Apr. 16, 1946 |
| 2,467,181 | Barnard et al. | Apr. 12, 1949 |
| 2,867,282 | Bagno et al. | Jan. 6, 1959 |